(12) United States Patent
Parsche

(10) Patent No.: US 8,771,481 B2
(45) Date of Patent: Jul. 8, 2014

(54) HYDROCARBON RESOURCE PROCESSING APPARATUS INCLUDING A LOAD RESONANCE TRACKING CIRCUIT AND RELATED METHODS

(75) Inventor: Francis Eugene Parsche, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 267 days.

(21) Appl. No.: 13/349,644

(22) Filed: Jan. 13, 2012

(65) Prior Publication Data

US 2013/0180889 A1 Jul. 18, 2013

(51) Int. Cl.
*C10G 15/08* (2006.01)

(52) U.S. Cl.
USPC ............. 204/172; 204/157.15; 204/157.43; 204/164; 204/168; 196/46; 196/121; 208/106

(58) Field of Classification Search
CPC ........ C10G 15/08; C10G 9/24; C07C 1/0495; C07C 4/16; H05C 3/00
USPC ......... 219/600, 635–636, 647, 650, 660–663, 219/665–666; 204/157.15, 157.43, 164, 204/168, 172; 208/106; 196/46, 121
See application file for complete search history.

(56) References Cited

U.S. PATENT DOCUMENTS

| | | | |
|---|---|---|---|
| 3,584,175 A | 6/1971 | Cardot | 219/7.5 |
| 4,506,126 A | 3/1985 | Smets et al. | 219/10.53 |
| 5,014,420 A | 5/1991 | Howard et al. | 29/846 |
| 5,183,985 A | 2/1993 | Sidky et al. | 219/10.61 R |
| 5,247,144 A | 9/1993 | Abe | 219/7.5 |
| 5,266,764 A | 11/1993 | Fox et al. | 219/10.75 |
| 5,887,018 A | 3/1999 | Bayazitoglu et al. | 373/139 |
| 5,914,065 A | 6/1999 | Alavi | 219/631 |
| 5,954,985 A | 9/1999 | Scott et al. | 219/666 |
| 6,097,013 A | 8/2000 | Hoeck | 219/620 |
| 6,590,190 B1 | 7/2003 | Simeray | 219/626 |
| 6,713,736 B2 | 3/2004 | Suzuki et al. | 219/644 |
| 6,730,894 B2 * | 5/2004 | Thompson et al. | 219/666 |
| 6,940,056 B2 | 9/2005 | Christofis et al. | 219/635 |
| 7,005,619 B2 | 2/2006 | Fujii et al. | 219/619 |
| 7,129,448 B2 | 10/2006 | Matsunaga et al. | 219/619 |
| 7,288,690 B2 | 10/2007 | Bellet et al. | 585/648 |
| 7,573,431 B2 | 8/2009 | Parsche | 343/788 |
| 7,889,146 B2 | 2/2011 | Halek et al. | 343/771 |
| 2005/0199386 A1 | 9/2005 | Kinzer | |
| 2007/0188397 A1 | 8/2007 | Parsche | 343/788 |
| 2009/0283257 A1 | 11/2009 | Becker | 166/248 |

(Continued)

FOREIGN PATENT DOCUMENTS

| | | |
|---|---|---|
| DE | 19517874 | 11/1995 |
| EP | 0081409 | 6/1983 |
| WO | 2010101827 | 9/2010 |

*Primary Examiner* — Brian McCaig
(74) *Attorney, Agent, or Firm* — Allen, Dyer, Doppelt, Milbrath & Gilchrist, P.A.

(57) ABSTRACT

A device for processing a hydrocarbon resource may include a hydrocarbon processing container configured to receive the hydrocarbon resource therein and having a pair of opposing ends with an enlarged width medial portion therebetween. The device may also a spirally wound electrical conductor surrounding the hydrocarbon processing container, and a radio frequency (RF) circuit coupled to the spirally wound electrical conductor and configured to supply RF power to the hydrocarbon resource while tracking a load resonance of the RF circuit. The RF circuit may be configured to generate magnetic fields within the hydrocarbon processing container parallel with an axis thereof.

13 Claims, 4 Drawing Sheets

(56) References Cited

U.S. PATENT DOCUMENTS

| | | | |
|---|---|---|---|
| 2010/0063271 A1* | 3/2010 | Allan et al. | 536/124 |
| 2010/0218940 A1 | 9/2010 | Parsche | 166/248 |
| 2010/0219105 A1 | 9/2010 | Parsche | 208/391 |
| 2010/0219107 A1 | 9/2010 | Parsche | 208/402 |
| 2010/0219108 A1 | 9/2010 | Parsche | 208/402 |
| 2010/0219182 A1 | 9/2010 | Parsche | 219/660 |
| 2010/0219184 A1 | 9/2010 | Parsche | 219/747 |
| 2010/0223011 A1 | 9/2010 | Parsche | 702/11 |
| 2013/0180885 A1 | 7/2013 | Parsche | |
| 2013/0180890 A1 | 7/2013 | Parsche | |
| 2013/0180980 A1 | 7/2013 | Parsche | |
| 2013/0183417 A1 | 7/2013 | Parsche | |

* cited by examiner

HYDROCARBON RESOURCE PROCESSING APPARATUS INCLUDING A LOAD RESONANCE TRACKING CIRCUIT AND RELATED METHODS

FIELD OF THE INVENTION

The present invention relates to the field of hydrocarbon resource processing, and, more particularly, to hydrocarbon resource processing devices including a spirally wound electrical conductor and related methods.

BACKGROUND OF THE INVENTION

A hydrocarbon resource may be particularly valuable as a fuel, for example, gasoline. One particular hydrocarbon resource, bitumen, may be used as a basis for making synthetic crude oil, which may be refined into gasoline by a process called upgrading. Accordingly, bitumen, for example, may be relatively valuable. More particularly, to produce 350,000 barrels a day of bitumen based synthetic crude oil would equate to about 1 billion dollars a year in bitumen. Moreover, about 8% of U.S. transportation fuels, e.g., gasoline, diesel fuel, and jet fuel, are synthesized or based upon synthetic crude oil.

In the hydrocarbon upgrading or cracking process, hydrocarbon molecules are broken to reduce molecular weight. Hydrogen is added to carbon to make high value liquid transportation fuels like gasoline, so, in the case of bitumen, natural gas is added to the bitumen. Natural gas provides the hydrogen. Bitumen provides the carbon. Certain ratios and mixes of carbon and hydrogen are gasoline, about 8 carbons to 18 hydrogens, e.g. $CH_3(CH_2)_6CH_3$. Gasoline is worth more then either bitumen or natural gas, and thus the reason for its synthesis.

One process for cracking the hydrocarbons is fluid catalytic cracking (FCC). In the FCC process, hot bitumen is applied to a catalyst, for example, $AlO_2$, at 900° C. with a relatively small amount of water to form synthetic crude oil. However, the FCC process has a limited efficiency, about 70%. The residual, also known as coke, is worth far less. Moreover, coke residues stop the FCC process, and the there is an increased risk of fires and explosions. The FCC process also has a poor molecular selectivity, and produces relatively high reactant emissions, especially ammonia. The catalyst used in the FCC process also has a relatively short lifespan.

Several references disclose the application of radio frequency (RF) electromagnetic energy to a hydrocarbon resource to heat the hydrocarbon resource, for example, for cracking. In particular, U.S. Patent Application Publication No. 2010/0219107 to Parsche, which is assigned to the assignee of the present application, discloses a method of heating a petroleum ore by applying RF energy to a mixture of petroleum ore and susceptor particles. U.S. Patent Application Publication Nos. 2010/0218940, 2010/0219108, 2010/0219184, 2010/0223011, 2010/0219182, all to Parsche, and all of which are assigned to the assignee of the present application disclose related apparatus for heating a hydrocarbon resource by RF energy. U.S. Patent Application Publication No. 2010/0219105 to White et al. discloses a device for RF heating to reduce use of supplemental water added in the recovery of unconventional oil, for example, bitumen.

Several references disclose applying RF energy at a particular frequency to crack the hydrocarbon resource. U.S. Pat. No. 7,288,690 to Bellet et al. discloses induction heating at frequencies in the range of 3-30 MHz. Application Publication No. 2009/0283257 to Becker discloses treating an oil well at a frequency range of 1-900 MHz and no more than 1000 Watts, using a dipole antenna, for example.

Application of RF to a hydrocarbon resource to heat the hydrocarbon resource, for example, for cracking, may not be particularly efficient as a relatively large amount of energy is lost in the heating process. Additionally, application of RF energy may result in irregularities in the heating process, such as, for example, inconsistent temperatures or hot spots.

U.S. Patent Application Publication No. 2010/0219184 to Parsche, which is also assigned to the assignee of the present application, discloses an RF heater for controlling the heating to certain materials of the hydrocarbon resource. The Parsche '184 application discloses a cyclone separator vessel that has a conical wall and a conically wound RF conductor adjacent the conical wall. The RF conductor couples to an RF source to heat hydrocarbon resources within the cyclone separator vessel.

Further improvements in the application of RF energy for heating, and more particularly, hydrocarbon resource upgrading may be desirable. For example, it may be desirable to increase the efficiency of the bitumen to gasoline conversion process, i.e. upgrading, by making it quicker and cheaper.

SUMMARY OF THE INVENTION

In view of the foregoing background, it is therefore an object of the present invention to increase the efficiency of hydrocarbon resource upgrading.

This and other objects, features, and advantages in accordance with the present invention are provided by an apparatus for processing a hydrocarbon resource that includes a hydrocarbon processing container configured to receive the hydrocarbon resource therein and having a pair of opposing ends with an enlarged width medial portion therebetween. The apparatus also includes a spirally wound electrical conductor surrounding the hydrocarbon processing container, and a radio frequency (RF) circuit coupled to the spirally wound electrical conductor and configured to supply RF power to the hydrocarbon resource while tracking a load resonance of the RF circuit. Accordingly, the hydrocarbon resource processing apparatus may provide increased efficiency in hydrocarbon resource upgrading by improving uniformity and by tracking the load resonance.

The RF circuit includes an RF amplifier having an input and an output, and a first electrical conductor adjacent the hydrocarbon processing container and coupled to the input of the RF amplifier. The RF circuit also includes a second electrical conductor coupled to the spirally wound electrical conductor and the output of the RF amplifier. The first electrical conductor includes a first ring, and the second electrical conductor includes a second ring.

The RF circuit is configured to generate magnetic fields within the hydrocarbon processing container parallel with an axis thereof, for example. The hydrocarbon processing container may have an ellipsoidal shape. The hydrocarbon processing container may have a spherical shape, for example.

A method aspect is directed to a method for processing a hydrocarbon resource. The method includes positioning the hydrocarbon resource within a hydrocarbon processing container having a pair of opposing ends with an enlarged width medial portion therebetween. The method further includes applying RF power from an RF circuit to a spirally wound electrical conductor surrounding the hydrocarbon processing container while tracking a load resonance of the RF circuit.

DETAILED DESCRIPTION OF THE PREFERRED EMBODIMENTS

Figure 1:
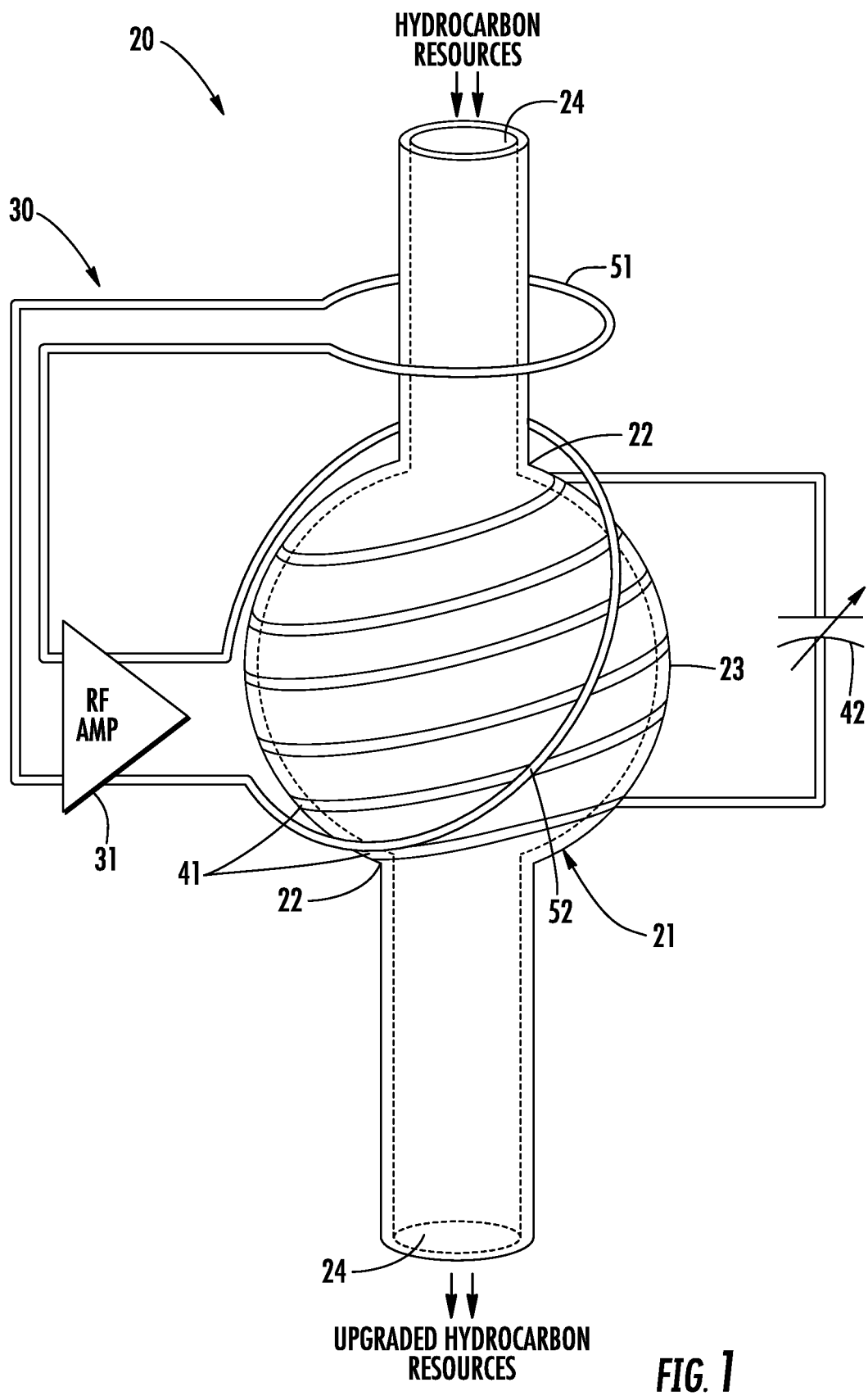
FIG. 1 is a schematic diagram of a hydrocarbon processing apparatus in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is described with reference to the attached figures. The figures are not drawn to scale and they are provided merely to illustrate the instant invention. Several aspects of the invention are described below with reference to example applications for illustration. It should be understood that numerous specific details, relationships and methods are set forth to provide a full understanding of the invention. One having ordinary skill in the relevant art, however, will readily recognize that the invention can be practiced without one or more of the specific details or with other methods. In other instances, well-known structures or operations not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring initially to FIG. 1, an apparatus 20 for processing a hydrocarbon resource includes a hydrocarbon processing container 21 configured to receive the hydrocarbon resource therein. The hydrocarbon processing container 21 includes a pair of opposing ends 22 with an enlarged width medial portion 23 therebetween.

The hydrocarbon processing container 21 is advantageously a dielectric material. For example, the hydrocarbon processing container 21 may be fiberglass, glass, quartz-polyimide, polytetrafluoroethylene (PTFE), or other dielectric material, for example.

The hydrocarbon processing container 21 illustratively has an ellipsoidal shape, and more particularly, a spherical shape. Of course, the hydrocarbon processing container 21 may be another shape so long as it includes a pair of ends and an enlarged width medial portion therebetween.

The hydrocarbon processing container 21 further has a pair of ports 24 therein aligned with corresponding ends. For example, the hydrocarbon resource may flow in one port, treated within the hydrocarbon processing container 21, and flow out of another port. The ports 24 may be in the form of an opening, or a combination of an opening and a tubular pipe, as illustrated. Of course, the hydrocarbon processing container 21 may include a single port therein for adding or removing hydrocarbon resources from the hydrocarbon processing container, for example, for batch processing instead of continuous processing.

The apparatus also includes a radio frequency (RF) circuit 30. The RF circuit 30 is configured to supply RF power at a desired frequency, for example, for treating hydrocarbon resources. The diameter of the hydrocarbon processing container 21 may be based upon the desired operating frequency. For example, the diameter of the hydrocarbon processing container 21 may be one-tenth of the wavelength of the desired operating frequency or less.

A spirally wound electrical conductor 41 surrounds the hydrocarbon processing container 21 and is inductively coupled to the RF circuit 30. The spirally wound electrical conductor 41 functions as an antenna or applicator of electromagnetic fields. The spirally wound electrical conductor 41 may be formed from a copper wire, for example, or a litz wire. More than one spirally wound electrical conductor 41 may surround the hydrocarbon processing contained and be coupled to the RF circuit 30. While a solenoid is a preferred winding type for the spirally wound electrical conductor 41, as shown in FIG. 1, other winding types may be used such as, for example, spiral wound, bank wound, sectional wound, multiple layer wound, or PI wound winding types.

The spirally wound electrical conductor 41 may be a hollow metal tube and distilled water may be circulated therein for cooling. Water, glycol, or an oil bath may be used for cooling. Cooled superconducting windings such as yttrium barium copper oxide (YBCO tape) may be used for application of magnetic fields, as large curling currents may be desired. This may advantageously provide increased energy density to reduce process time.

A reactance element 42 is coupled to the spirally wound electrical conductor 41. The reactance element 42 is illustratively in the form of a capacitor, which may be a vacuum capacitor, for example. Of course, more than one reactance element 42 may be coupled to the spirally wound electrical conductor 41, and different types of reactance elements may be used, such as inductors or transmission line stubs. The reactance element 42 advantageously may operate as a tuning element or resonating element to adjust the operating frequency.

The RF circuit 30 is advantageously configured to supply RF power to the hydrocarbon resource while tracking a load resonance of the RF circuit. As will be appreciated by those skilled in the art, as the hydrocarbon resource is treated, the tuning of the spirally wound electrical conductor 41 drifts. These drifts are tracked and compensated by feedback in the RF circuit 30. Of course other feedback devices may be used, such as, a microprocessor.

The RF circuit 30 includes an RF amplifier 31 that has an input and an output. The RF amplifier 31 may be for example, a tetrode vacuum tube such as the 8974/X2159 by CPI Eimac of Palo Alto, Calif. Arrays of solid state RF amplifiers may also be used. The gain of the RF amplifier 31 may be relatively small, for example, a factor of 2, as oscillations may quickly build to the saturation level, e.g., full RF power. The RF circuit 30 also includes a first electrical conductor 52 in the form of a conductive ring that is coupled to an input of the RF amplifier 31 and is adjacent the hydrocarbon processing container 21, and more particularly, adjacent the port 24. The first electrical conductor 52 is spaced from the hydrocarbon processing container 21 above the enlarged width medial portion 23. In other words, the first electrical conductor 52 is also inductively coupled to the spirally wound electrical conductor 41. Of course, the first electrical conductor 52 may be spaced elsewhere in relation to the enlarged width medial portion 23 and may not surround the hydrocarbon processing container 21. In some embodiments, the first electrical conductor 52 may be in other forms or shapes.

The first electrical conductor 52 advantageously provides feedback to drive the RF amplifier 31 into oscillation. This configuration tracks the frequency of the RF power supplied to the hydrocarbon resource and the load resonance of the spirally wound electrical conductor 41. Oscillations are self starting due to electrical noise caused by thermal agitation of electrons in the electrical conductors. The thermal noise is amplified until oscillations build up on the resonant frequency of the spirally wound electrical conductor 41. In typical practice, oscillations form in microseconds at radio frequencies.

The output of the RF amplifier 31 is electrically coupled to a second electrical conductor 51 that is also in the form of a conductive ring and that surrounds and is spaced from the enlarged width medial portion 23, and, more particularly, the spirally wound electrical conductor 41. In other words, the second electrical conductor 51 is inductively coupled to the spirally wound electrical conductor. The second electrical conductor 51 and RF amplifier 31 cooperate to provide a desired impedance, for example, 50 Ohms. The second electrical conductor 51 may be rotated about an axis around the enlarged width medial portion 23 to adjust the impedance. In other words, the spirally wound electrical conductor 41 may be conceptually considered a transformer winding or a transformer secondary, and the second electrical conductor 51 and the RF circuit 30 cooperate to provide a variable transformer ratio. Rotating the loop plane of the second electrical conductor 51 orthogonally to the flux of the spirally wound electrical conductor 41 increases the resistance, and rotating it back reduces the resistance. This occurs according to mutual inductance.

Figure 2:
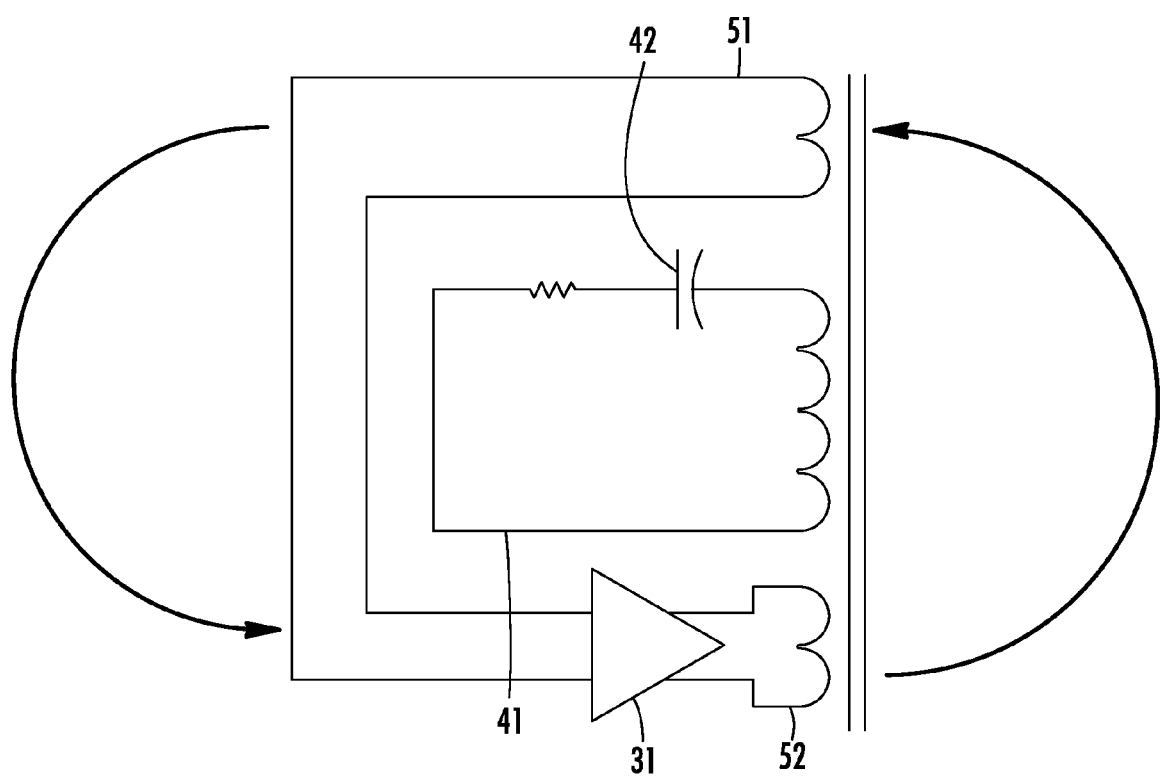
FIG. 2 is a schematic diagram of a circuit equivalent of the hydrocarbon processing device of FIG. 1.

Referring additionally to the circuit equivalent diagram of FIG. 2, as noted above, the spirally wound electrical conductor 41 may be conceptually considered a transformer winding or a transformer secondary, and the second electrical conductor 51 and the RF circuit 30 cooperate to provide a variable transformer ratio. The feedback into the RF amplifier 31 from the first electrical conductor 52 that advantageously provides the oscillation is coupled through the resonance of the spirally wound electrical conductor 41. Thus, an increased feedback amplitude, for example, the largest feedback amplitude, is provided at the resonant frequency of the spirally wound electrical conductor 41. It is at the resonant frequency that the oscillations converge.

As will be appreciated by those skilled in the art, the RF circuit 30, and more particularly, the first and second electrical conductors 52, 51 may be electrically coupled to the spirally wound electrical conductor 41. Of course, one of the first and second electrical conductors 52, 51 may be electrically coupled to the spirally wound electrical conductor 41, while the other may be inductively coupled.

Figure 3:
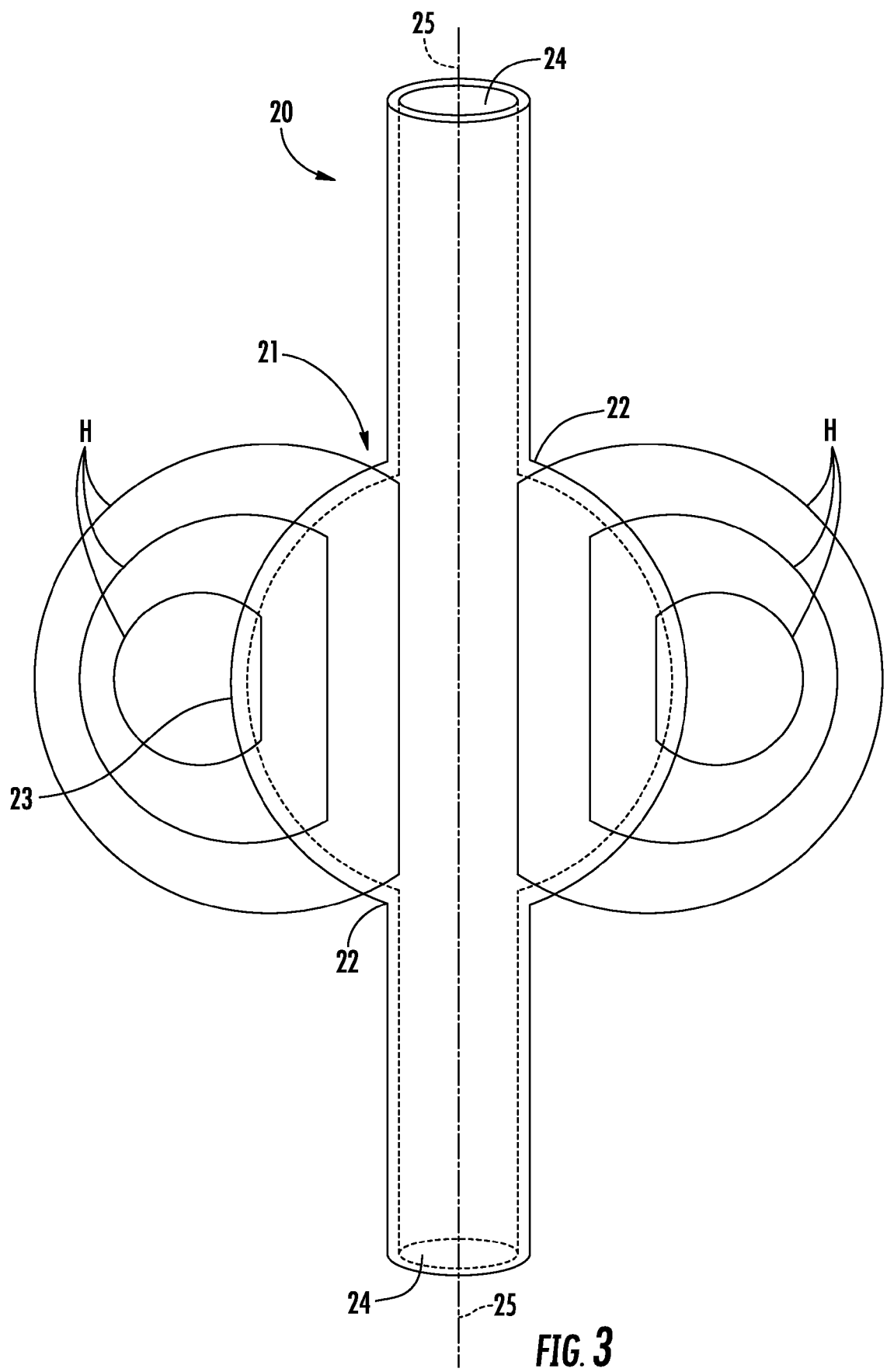
FIG. 3 is schematic diagram of a portion of the apparatus of FIG. 1 illustrating magnetic flux lines.

Referring now additionally to FIG. 3, the spirally wound electrical conductor 41 is configured to generate magnetic fields within the hydrocarbon processing container 21 that are parallel with an axis 25 thereof. More particularly, the spherical shape of the hydrocarbon processing container 21 results in the magnetic flux lines H being straight and uniform within the hydrocarbon processing container. This advantageously may result in more uniform heating or processing, and thus, may increase the efficiency of the hydrocarbon resource upgrading process.

As will be appreciated by those skilled in the art, the second conductive ring 51 may not change the magnetic fields H, but rather changes the impedance/resistance. Instead, the number of times the spirally wound electrical conductor 41 wraps around the hydrocarbon processing container 21, which may be conceptually thought of as transformer turns or windings, adjusts the electric and magnetic fields ratio. For example, a lesser number of turns along with a relatively large reactance element 42 advantageously may result in stronger magnetic fields and weaker electric fields. In contrast, an increased number of turns along with a relatively small reactance element 42 may result in stronger electric fields and weaker magnetic fields.

Additionally, altering the shape of the hydrocarbon processing container 21 may also adjust the electric and magnetic fields. In particular, as the shape of the hydrocarbon processing container 21 is changed to a prolate spheroid from a spherical shape, for example, the electric fields become stronger, while the magnetic fields become weaker. In contrast, as the shape of the hydrocarbon processing container 21 is changed to an oblate spheroid from a spherical shape, for example, the electric fields become weaker, while the magnetic fields become stronger. As will be appreciated by those skilled in the art, the present embodiments hybridize between divergence and curl, translation and rotation, and the line and circle of Euclidian geometry.

Figure 4:
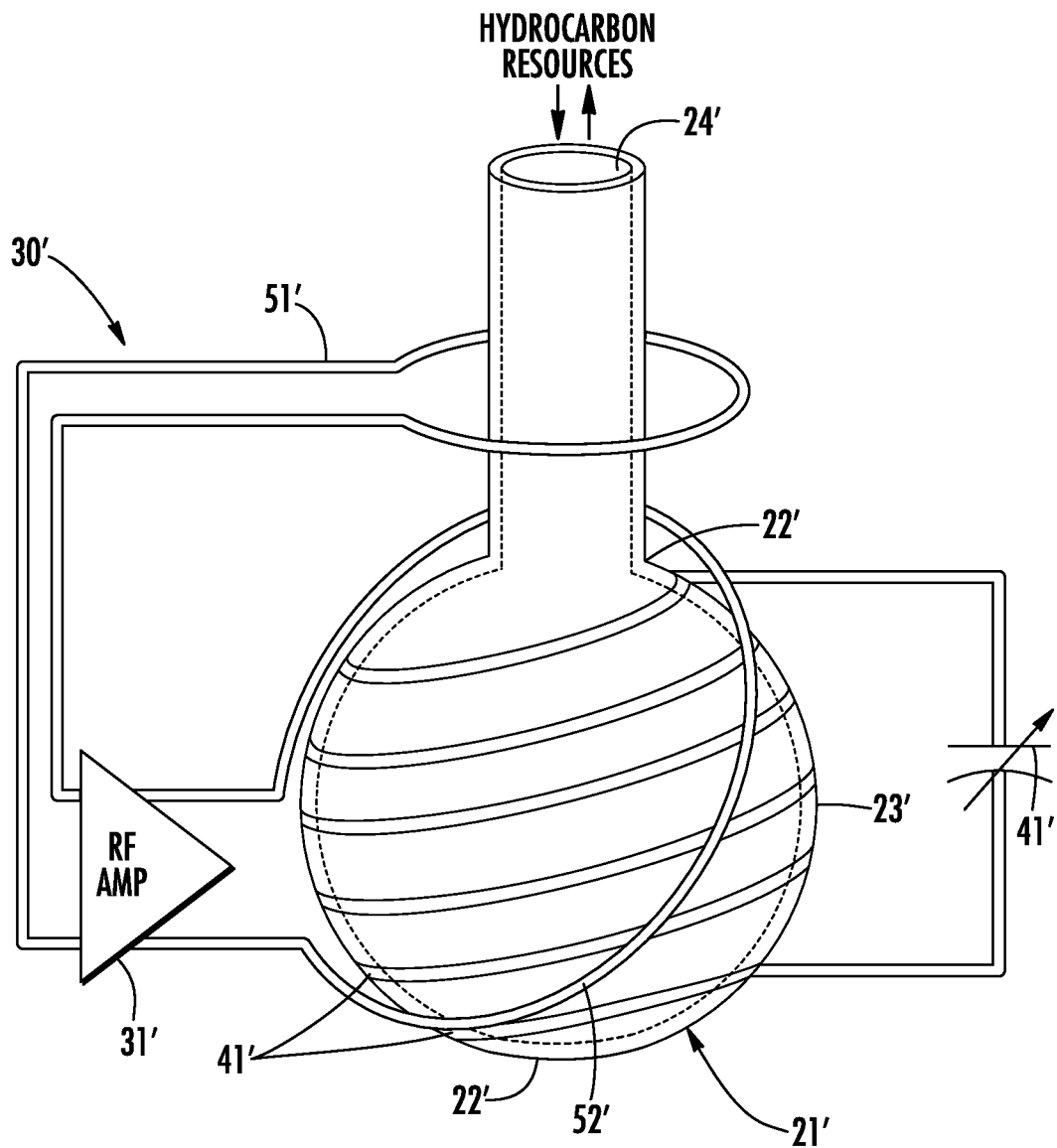
FIG. 4 is a schematic diagram of a hydrocarbon processing apparatus in accordance with another embodiment of the present invention.

Referring now additionally to FIG. 4, in another embodiment, the hydrocarbon processing container 21' has a single port 24' for adding or removing hydrocarbon resources from the hydrocarbon processing container. The single port 24' may be particularly advantageous for batch processing the hydrocarbon resource.

A method aspect is directed to a method for processing a hydrocarbon resource. The method includes positioning the hydrocarbon resource within a hydrocarbon processing container 21 having a pair of opposing ends 22 with an enlarged width medial portion 23 therebetween. The method also includes applying RF power from an RF circuit 30 to a spirally wound electrical conductor 41 surrounding the hydrocarbon processing container while tracking a load resonance of the RF circuit.

Further details of hydrocarbon processing apparatus and methods are described in related U.S. patent application Ser. Nos. 13/349,655, 13/349,668, 13/349,684, and 13/349,699, the entire contents of all of which are hereby incorporated by reference. As will be appreciated by those skilled in the art, That which is claimed is:

1. An apparatus for processing a hydrocarbon resource comprising:
   a hydrocarbon processing container configured to receive the hydrocarbon resource therein and having a pair of opposing ends with an enlarged width medial portion therebetween;
   a spirally wound electrical conductor surrounding said hydrocarbon processing container; and
   a radio frequency (RF) circuit coupled to said spirally wound electrical conductor and configured to supply RF power to the hydrocarbon resource while tracking a load resonance of said RF circuit, said RF circuit comprising
      an RF amplifier having an input and an output,
      a first electrical conductor adjacent said hydrocarbon processing container and coupled to the input of said RF amplifier, and
      a second electrical conductor coupled to said spirally wound electrical conductor and the output of said RF amplifier.

2. The apparatus according to claim 1, wherein said first electrical conductor comprises a first ring; and wherein said second electrical conductor comprises a second ring.

3. The apparatus according to claim 1, wherein said RF circuit is configured to generate magnetic fields within said hydrocarbon processing container parallel with an axis thereof.

4. The apparatus according to claim 1, wherein said hydrocarbon processing container has an ellipsoidal shape.

5. The apparatus according to claim 1, wherein said hydrocarbon processing container has a spherical shape.

6. The apparatus according to claim 1, wherein said hydrocarbon processing container further has a port therein aligned with a corresponding end.

7. The apparatus according to claim 1, wherein said hydrocarbon processing container comprises a dielectric material.

8. The apparatus according to claim 1, further comprising a reactance element coupled to said spirally wound electrical conductor.

9. An apparatus for processing a hydrocarbon resource comprising:
   a spherically shaped hydrocarbon processing container configured to receive the hydrocarbon resource therein and having a pair of opposing ends with an enlarged width medial portion therebetween;
   a spirally wound electrical conductor surrounding said spherically shaped hydrocarbon processing container; and
   a radio frequency (RF) circuit coupled to said spirally wound electrical conductor and configured to supply RF power to the hydrocarbon resource while tracking a load resonance thereof, said RF circuit being configured to generate magnetic fields within said spherically shaped hydrocarbon processing container parallel with an axis of said RF circuit, said RF circuit comprising
      an RF amplifier having an input and an output,
      a first electrical conductor adjacent said spherically shaped hydrocarbon processing container and coupled to the input of said RF amplifier, and
      a second electrical conductor coupled to said spirally wound electrical conductor and the output of said RF amplifier.

10. The apparatus according to claim 9, wherein said first electrical conductor comprises a first ring; and wherein said second electrical conductor comprises a second ring.

11. The apparatus according to claim 9, wherein said spherically shaped hydrocarbon processing container further has a port therein aligned with a corresponding end.

12. The apparatus according to claim 9, wherein said spherically shaped hydrocarbon processing container comprises a dielectric material.

13. The apparatus according to claim 9, further comprising a reactance element coupled to said spirally wound electrical conductor.

* * * * *